(12) United States Patent
Demerchant et al.

(10) Patent No.: US 9,478,246 B2
(45) Date of Patent: Oct. 25, 2016

(54) PROVIDING AUDIO VIDEO CONTENT DURING PLAYBACK PAUSE

(71) Applicant: SONY CORPORATION, Tokyo (JP)

(72) Inventors: Marvin Demerchant, San Diego, CA (US); Hye Hoon Yi, Escondido, CA (US); Takeshi Suzuki, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 160 days.

(21) Appl. No.: 14/208,114

(22) Filed: Mar. 13, 2014

(65) Prior Publication Data
US 2015/0262613 A1   Sep. 17, 2015

(51) Int. Cl.
| | |
|---|---|
| H04N 9/80 | (2006.01) |
| H04N 9/82 | (2006.01) |
| G11B 19/02 | (2006.01) |
| G11B 27/10 | (2006.01) |
| H04N 9/88 | (2006.01) |
| H04N 5/76 | (2006.01) |

(52) U.S. Cl.
CPC ............. *G11B 19/02* (2013.01); *G11B 27/105* (2013.01); *H04N 5/76* (2013.01); *H04N 9/8205* (2013.01)

(58) Field of Classification Search
USPC ........ 386/239, 240, 241, 248, 249, 250, 251
See application file for complete search history.

(56) References Cited

U.S. PATENT DOCUMENTS

| | | | |
|---|---|---|---|
| 6,570,624 | B2 | 5/2003 | Cornog et al. |
| 6,580,870 | B1 * | 6/2003 | Kanazawa et al. ........... 386/240 |
| 6,665,450 | B1 | 12/2003 | Cornog et al. |
| 7,103,231 | B2 | 9/2006 | Cornog et al. |
| 7,260,311 | B2 | 8/2007 | Okujima et al. |
| 7,369,743 | B2 | 5/2008 | Watkins et al. |
| 7,394,968 | B2 | 7/2008 | Watkins |
| 7,463,819 | B2 | 12/2008 | Law et al. |
| 8,005,344 | B2 | 8/2011 | Watkins |
| 2003/0035592 | A1 | 2/2003 | Cornog et al. |
| 2003/0072556 | A1 | 4/2003 | Okujima et al. |
| 2003/0093790 | A1 * | 5/2003 | Logan et al. ................... 725/38 |
| 2003/0140083 | A1 | 7/2003 | Watkins |
| 2003/0140350 | A1 | 7/2003 | Watkins et al. |
| 2004/0091170 | A1 | 5/2004 | Cornog et al. |
| 2006/0093317 | A1 | 5/2006 | Law et al. |
| 2008/0222679 | A1 | 9/2008 | Watkins |
| 2011/0200304 | A1 | 8/2011 | Rutledge |

* cited by examiner

Primary Examiner — Daquan Zhao
(74) Attorney, Agent, or Firm — John L. Rogitz

(57) ABSTRACT

An audio video display device (AVDD) can present recorded content that can be paused. During pausing, ancillary AV content is shown until such time as a play or other signal is received.

14 Claims, 2 Drawing Sheets

AVDD logic alternate ancillary
Audio/Video source logic

PROVIDING AUDIO VIDEO CONTENT DURING PLAYBACK PAUSE

FIELD OF THE INVENTION

The application relates generally to providing audio video (AV) content during playback pause.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

SUMMARY OF THE INVENTION

An example ecosystem that is pertinent here is an entertainment ecosystem in the home that includes a primary display, potentially controlled by a controller such as a personal computer (PC) or game console, which receives signals from a portable control device such as a tablet computer to playback recorded AV content.

Accordingly, a computer device includes at least one computer readable storage medium bearing instructions executable by a processor, and at least one processor configured for accessing the computer readable storage medium to execute the instructions to configure the processor for, during playback of recorded audio video (AV) content on a display device, in which a signal to pause playback is generated, responsive to the signal to pause playback, causing ancillary AV content to be presented on the display device. The ancillary AV content includes video.

In some embodiments, the computer device is the display device, and the instructions when executed by the processor configure the processor for receiving the signal to pause playback, and responsive to the signal to pause playback, pausing playback of the recorded AV. In other embodiments the computer device is not the display device.

If desired, the instructions when executed by the processor can configure the processor for determining a location in the recorded AV content at which playback was paused. The instructions when executed by the processor configure the processor for, responsive to a determination that playback was paused at a first location in the recorded AV content, causing first ancillary AV content to be presented on the display device. Also, the instructions when executed by the processor configure the processor for, responsive to a determination that playback was paused at a second location in the recorded AV content, causing second ancillary AV content to be presented on the display device.

In examples, the instructions when executed by the processor configure the processor for, responsive to the signal to pause playback, causing first ancillary AV content to be presented on the display device responsive to a determination of first prior user operation of the display device. The instructions when executed by the processor configure the processor for, responsive to the signal to pause playback, causing second ancillary AV content to be presented on the display device responsive to a determination of second prior user operation of the display device.

In some embodiments, the instructions when executed by the processor configure the processor for, responsive to the signal to pause playback, causing first ancillary AV content to be presented on the display device responsive to a determination of first user demographics. The instructions when executed by the processor configure the processor for, responsive to the signal to pause playback, causing second ancillary AV content to be presented on the display device responsive to a determination of second user demographics.

In example implementations the instructions when executed by the processor configure the processor for, responsive to a signal to pause during presentation of the ancillary AV content, causing the ancillary AV content not to be presented on the display device. The signal to pause during presentation of the ancillary AV content may be a play command, and the instructions when executed by the processor configure the processor for causing playback of the recorded AV content to be resumed on the display device.

In another aspect, a method includes presenting recorded content on a display device, pausing playback of the recorded content, and responsive to the pausing, presenting ancillary AV content on the display device until such time as a predetermined subsequent command is received.

In another aspect, a system includes a display device, a control device manipulable by a person to command the display device to play recorded AV content and to pause playback of the recorded AV content, and a processor. The processor is configured for, responsive to a signal to pause, playback of the recorded AV content, causing ancillary AV content to be presented on the display device.

The details of the present invention, both as to its structure and operation, can be best understood in reference to the accompanying drawings, in which like reference numerals refer to like parts, and in which:

DETAILED DESCRIPTION

Figure 1:
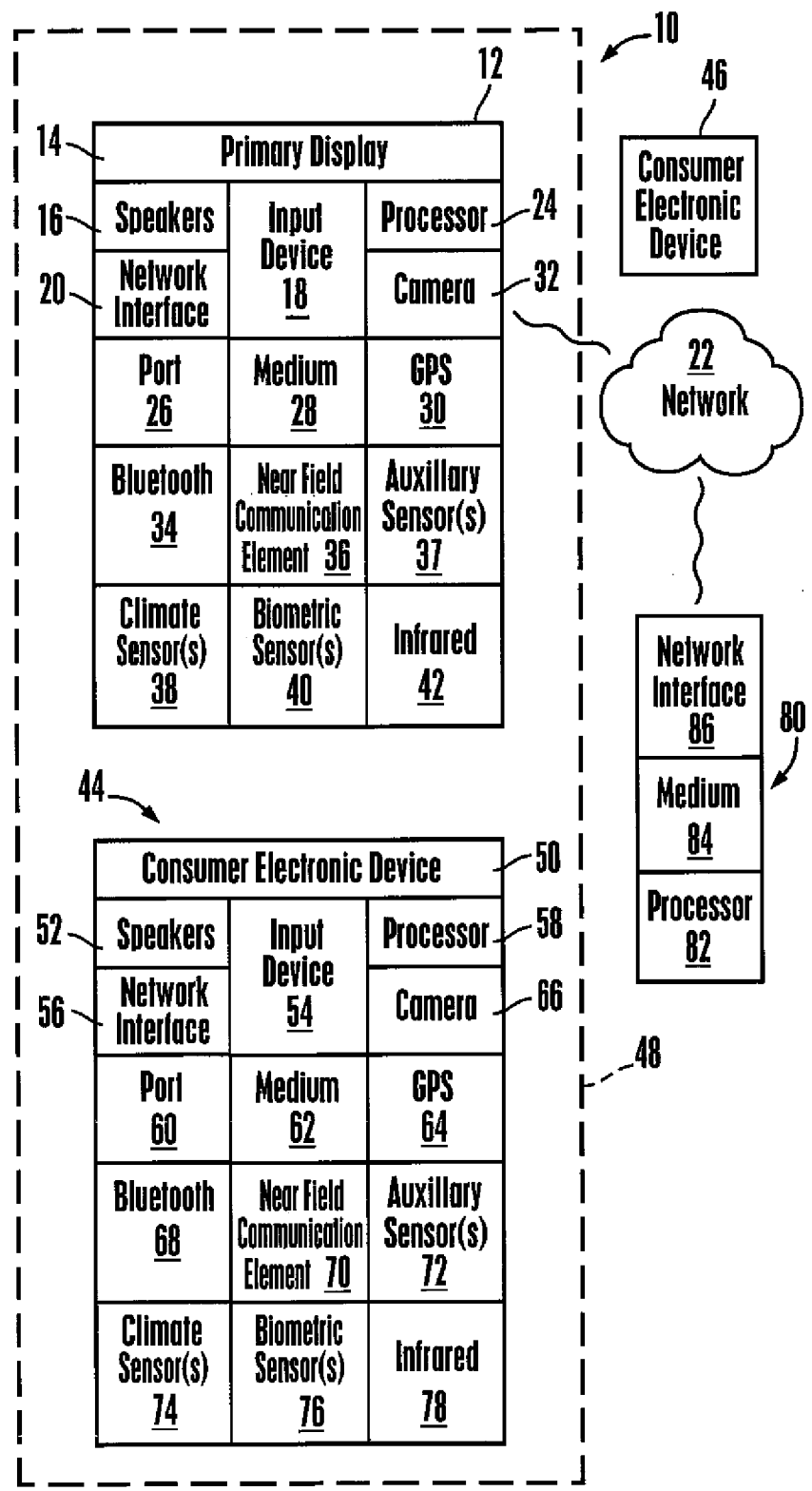
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. The AVDD 12 may further include one or more tangible computer readable storage medium 28 such as disk-based or solid state storage, in some cases embodied in the chassis of the AVDD as standalone devices or as a personal video recording device (PVR) or video disk player either internal or external to the chassis of the AVDD for playing back AV programs. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVDD 12, or it may be a more sophisticated device such as a tablet computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USE port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFD)) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
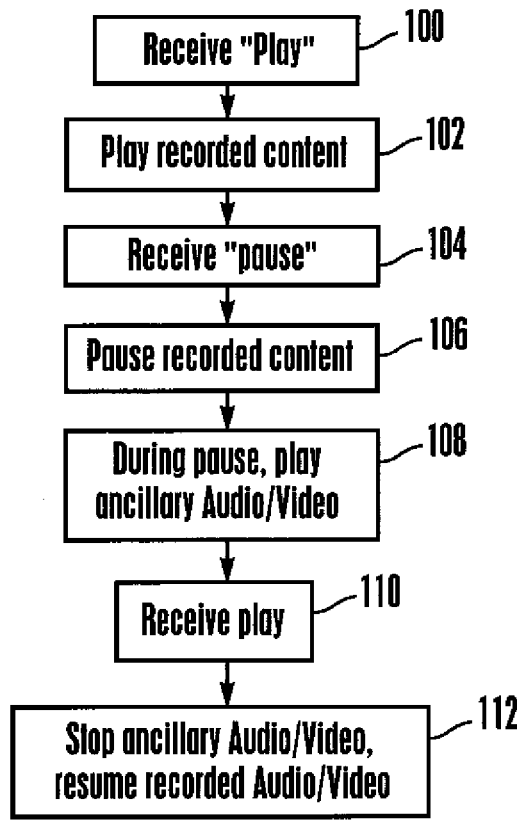
FIGS. 2 and 3 are flow charts of example logic according to present principles.

FIG. 2 shows example logic that may executed by the AVDD 12, alone or in concert with the processors of other devices in the network. At block 100, a "play" command is received from, e.g., the first CE device 44 implementing a remote control (RC) function of the AVDD. The "play" command is in reference to recorded content that typically is present as the current input to the display of the AVDD 12 as sourced from one of the above-described input storages of the AVDD or from an external source such as the second CE device 46 implemented as, for instance, an external PVR or video disk player.

The AVDD 12 responsive to the play command plays the recorded content at block 102. At block 104, the AVDD 12 receives a pause signal and duly pauses play of the recorded AV at block 106. The pause signal may be generated by a user inputting a pause command using, e.g., a remote control or by other means, e.g., a system-generated pause.

Conventionally, during the period the user has paused play of recorded AV content, a single still image is presented on the AVDD. For example, when one of a group of viewers temporarily leaves the room, the recorded AV may be paused until she returns, with the remaining viewers in the interim gazing in ennui at the still image.

According to present principles, however, at block 108, responsive to a pause in the play of the recorded AV content, ancillary AV content including video automatically is presented on the AVDD 12 without any user command or interaction to do so after the pause command is input. Preferably, the ancillary content is presented during the period of pause, until such time as a play command is received again at block 110, at which point at block 112 the ancillary content is removed from presentation and the recorded AV content played from the point at which it was paused at block 104.

Figure 3:
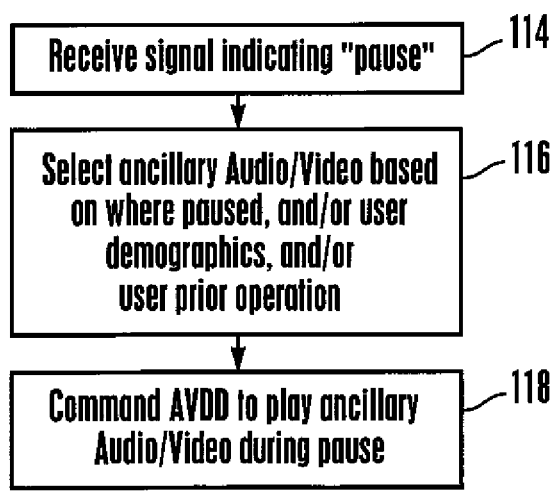

As alluded to above, present principles may be executed by multiple processors working in concert, and FIG. 3 shows such an embodiment as may be executed by, e.g., the second CE device 46 implemented by an AV storage device such as a PVR or disk player. At block 114, the CE device 46 processor can receive, from the first CE device 44 implemented as an RC, a signal that the first CE device 44 has commanded the AVDD 12 to pause play of the recorded content. This signal may simply be an intercept of the pause command from the first CE device 44 or it may be an informative message sent, e.g., via Wi-Fi from the first device 44 to the second device 46 that the pause command has been issued to the AVDD.

At block 116, one of the CE devices 44, 46 selects the ancillary AV content to be presented on the AVDD according to further disclosure below and at block 118 commands the AVDD to play the ancillary AV content during the pause, which command may include streaming or otherwise transmitting to the AVDD the ancillary AV content itself.

In selecting the ancillary AV content to play during the pause of the play of the recorded content, one or more selection rules may be employed. For example, the ancillary AV content may be selected based on the location in the stream of the recorded content play of the recorded content was paused. Thus, if the recorded content is paused at chapter 4, a first ancillary AV content may be played, whereas if the recorded content is paused at chapter 7, a second ancillary AV content may be played that is different from the first ancillary content.

The ancillary AV content may be provided on the same storage medium as the recorded AV content, e.g., on the same video disk as the recorded content. Or, the ancillary content may be sourced from a different storage than the recorded content. For example, some or all I-frames of the recorded content may contain in metadata a network address such as the address of the server 80, and should play be paused at a particular I-frame, the AVDD processor can be programmed to access the network address in the metadata and stream the ancillary content therefrom. Or, as part of a pause command, one of the CE devices 44, 46 may send to the AVDD 12 the network address, commanding the AVDD 12 to stream ancillary content from the network. Yet again, the AVDD may be programmed to access a network address every time a pause command is received and provide the network address with the identification of the recorded AV content and where in the recorded content it was paused, or with the demographic and/or operation history information discussed further below, to download ancillary content as provided by the server at the network address based on, if desired, the above information uploaded from the AVDD.

Ancillary content may also be provided for play during pause of recorded content based on user demographics, such that a first ancillary content is provided for first user demographics while second ancillary content is provided for second user demographics. Demographics without limitation may be determined by user login information. For example, in many home entertainment systems, individual users have user accounts which may contain demographic information, and upon receipt of a pause command, the user demographics are looked up by the AVDD 12 and correlated to associated ancillary AV content stored on the AVDD 12 locally or in the home network or at a network address provided as part of the recorded content or otherwise sent or provided to the AVDD. Or, the AVDD 12 responsive to the pause command may image viewers in front of the AVDD using the camera 32 and execute face recognition on the viewer(s) to recognize age, gender, ethnicity, etc. The nearest (largest image) viewer may be used as a proxy when multiple users are present to determine the demographics to be correlated to the ancillary content, or the demographics to be correlated to the ancillary content may consist only of common demographic features among multiple viewers.

Yet again, as a user or users operate the AVDD 12, their operations may be recorded, and based on past (historical) user operation of the AVDD 12, the ancillary content may be determined. For example, if user "A" has predominantly watched race car events in the past, this fact is stored, and upon subsequent pause of recorded AV content, ancillary content related to upcoming race car programs as may be obtained from an electronic schedule available to the AVDD 12 and/or CE devices 44, 46, such as an electronic program guide (EPG), may be presented. In one non-limiting example, this ancillary content may be provided by, e.g., an automatic input source change to the previously viewed racing channel during the pause interval of the recorded content, with the current content from the previously viewed channel being presented as the ancillary AV content.

Ancillary content may also include interactive content like quizzes or facts that may be related to content being watched. Live content with the same interaction may also exist. Ancillary content may be provided based on who is watching by, e.g., detecting through the camera of the AVDD personal identities using image recognition to adapt the content, which may be advertising content, to the people watching, e.g., children, parents, male, female, etc.

While the particular PROVIDING AUDIO VIDEO CONTENT DURING PLAYBACK PAUSE is herein shown and described in detail, it is to be understood that the subject matter which is encompassed by the present invention is limited only by the claims.

What is claimed is:

1. A computer device comprising:
   at least one computer memory that is not a transitory signal and that comprises instructions executable by at least one processor for:
   during playback of recorded audio video (AV) content on a display device, in which a signal to pause playback is generated, responsive to the signal to pause playback, determining a location in the recorded AV content at which playback was paused;
   responsive to a determinination that playback was paused at a first location in the recorded AV content, causing first ancillary AV content to be presented on the display device;
   responsive to a determination that playback was paused at a second location in the recorded AV content, causing second ancillary AV content to be presented on the display device, the first ancillary content not being from the same content stream as the second ancillary content.

2. The computer device of claim 1, wherein the computer device is the display device, and the instructions are executable for:
   receiving the signal to pause playback; and
   responsive to the signal to pause playback, pausing playback of the recorded AV.

3. The computer device of claim 1, wherein the computer device is not the display device.

4. The computer device of claim 1, comprising the at least one processor.

5. The computer device of claim 1 wherein the instructions are executable for:
   responsive to the signal to pause playback, causing first ancillary AV content to be presented on the display device responsive to a determination of first prior user operation of the display device;
   responsive to the signal to pause playback, causing second ancillary AV content to be presented on the display device responsive to a determination of second prior user operation of the display device.

6. The computer device of claim 1. wherein the instructions are executable for:
   responsive to the signal to pause playback, causing first ancillary AV content to be presented on the display device responsive to accessing first user demographics responsive to the signal to pause playback:,
   responsive to the signal to pause playback, causing second ancillary AV content to be presented on the display device responsive to accessing second user demographics responsive to the signal to pause playback.

7. The computer device of claim 1, wherein the instructions are executable for:
   responsive to a signal to pause during presentation of the ancillary AV content, causing the ancillary AV content not to be presented on the display device.

8. The computer device of claim 7, wherein the signal to pause during presentation of the ancillary AV content is a play command, and the instructions are executable for causing playback of the recorded AV content to be resumed on the display device.

9. Method comprising:
   presenting recorded content on a display device;
   pausing playback of the recorded content; and
   responsive to the pausing, automatically presenting ancillary AV content on the display device until such time as a predetermined subsequent command is received, wherein the presenting comprises:
   responsive to the command to pause playback, causing first ancillary AV content to be presented on the display device responsive to a determination that a first prior user operation of the display device is of a first type, the first prior user operation not being the command to pause playback;
   responsive to the command to pause playback, causing second ancillary AV content to be presented on the display device responsive to a determination that a second prior user operation of the display device is of a second type different than the first type, the second prior user operation being a different operation than the first prior user operation and also being different than the command to pause playback.

10. The method of claim 9, wherein predetermined subsequent command is a play command.

11. The method of claim 9, responsive to the command to pause playback, pausing playback of the recorded AV.

12. The method of claim 9, comprising:
    determining a location in the recorded AV content at which playback was paused;

responsive to a determination that playback was paused at a first location in the recorded AV content, causing first ancillary AV content to be presented on the display device;

responsive to a determination that playback was paused at a second location in the recorded AV content, causing second ancillary AV content to be presented on the display device.

13. The method of claim 9, comprising:

responsive to he command to pause playback, causing first ancillary AV content to be presented on the d splay device responsive to a determination of first user demographics;

responsive to the command to pause playback, causing second ancillary AV content to be presented on the display device responsive to a determination of second user demographics.

14. The method of claim 9, comprising:

responsive to a signal to pause during presentation of the ancillary AV content, causing the ancillary AV content not to be presented on the display device.

\* \* \* \* \*